US012749831B2

(12) United States Patent
Xiao et al.

(10) Patent No.: US 12,749,831 B2
(45) Date of Patent: Sep. 29, 2026

(54) COMMUNICATION APPARATUS AND BASE STATION ANTENNA FEEDER SYSTEM

(71) Applicant: HUAWEI TECHNOLOGIES CO., LTD., Shenzhen (CN)

(72) Inventors: Weihong Xiao, Dongguan (CN); Dingjiu Daojian, Dongguan (CN); Heino Cumpanas, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 18/884,520

(22) Filed: Sep. 13, 2024

(65) Prior Publication Data

US 2025/0007184 A1 Jan. 2, 2025

Related U.S. Application Data

(63) Continuation of application No. PCT/CN2023/081009, filed on Mar. 13, 2023.

(30) Foreign Application Priority Data

Mar. 14, 2022 (CN) ........................ 202210248529.X

(51) Int. Cl.

| | |
|---|---|
| ***H01Q 21/30*** | (2006.01) |
| ***F03D 9/43*** | (2016.01) |
| ***H01Q 1/24*** | (2006.01) |
| ***H01Q 1/36*** | (2006.01) |
| ***H01Q 1/50*** | (2006.01) |

(52) U.S. Cl.
CPC ............... *H01Q 21/30* (2013.01); *F03D 9/43* (2016.05); *H01Q 1/24* (2013.01); *H01Q 1/36* (2013.01); *H01Q 1/50* (2013.01)

(58) Field of Classification Search
CPC ............ H01Q 21/30; H01Q 1/24; H01Q 1/36; H01Q 1/50; H01Q 1/1242; H01Q 1/246; H01Q 21/20; F03D 9/43; F03D 9/00; F03D 13/20; F03D 1/06
See application file for complete search history.

(56) References Cited

U.S. PATENT DOCUMENTS 7,324,057 B2 1/2008 Argaman et al.
8,456,033 B2 * 6/2013 Halstead .................. F03D 3/02 290/55

(Continued)

FOREIGN PATENT DOCUMENTS

CN 109974543 A 7/2019
CN 110108174 A 8/2019

(Continued)

*Primary Examiner* — Seung H Lee
(74) *Attorney, Agent, or Firm* — Rimon PC

(57) ABSTRACT

This application provides a communication apparatus and a base station antenna feeder system. The communication apparatus includes a power generation assembly, an antenna, and a fastening assembly. The power generation assembly includes a blade and a generator. A rotating shaft of the blade is connected to the generator. The blade, the generator, and the antenna are mounted to the fastening assembly. The fastening assembly is configured to mount the blade, the generator, and the antenna to a mounting bracket. The antenna may be disposed around the rotating shaft of the blade.

20 Claims, 10 Drawing Sheets

(56) References Cited

U.S. PATENT DOCUMENTS

| | | | | |
|---|---|---|---|---|
| 8,951,011 | B2 * | 2/2015 | Li | F03D 7/042 416/31 |
| 11,346,512 | B1 * | 5/2022 | Hsieh | F21V 17/12 |
| 2004/0232703 | A1 | 11/2004 | Michael | |
| 2010/0266412 | A1 | 10/2010 | Barber | |
| 2016/0248151 | A1 | 8/2016 | Proshold et al. | |

FOREIGN PATENT DOCUMENTS

| | | | |
|---|---|---|---|
| EP | 2763234 | B1 | 9/2015 |
| WO | 2021197081 | A1 | 10/2021 |

* cited by examiner

COMMUNICATION APPARATUS AND BASE STATION ANTENNA FEEDER SYSTEM

CROSS-REFERENCE TO RELATED APPLICATIONS

This application is a continuation of International Application No. PCT/CN2023/081009, filed on Mar. 13, 2023, which claims priority to Chinese Patent Application No. 202210248529.X, filed on Mar. 14, 2022. The disclosures of the aforementioned applications are hereby incorporated by reference in their entireties.

TECHNICAL FIELD

This application relates to the field of communication technologies, and in particular, to a communication apparatus and a base station antenna feeder system.

BACKGROUND

A plurality of base station antennas in a wireless communication system have been widely utilized. Increasing an antenna aperture space is an effective way to obtain coverage and capacity benefits. Technologies such as extremely large antenna array (ELAA) have gotten public attention. However, due to factors such as wind load, a volume, and a weight, it has been a great challenge to obtain a larger aperture space of the antenna. Therefore, how to obtain a larger aperture space without causing too much negative impact from factors such as the volume, the weight, and the wind load is a technical problem that needs to be urgently resolved in this field.

SUMMARY

This application provides a communication apparatus and a base station antenna feeder system, to increase aperture space of an antenna, and improve coverage and capacity benefits of the antenna. The antenna and a power generation assembly reuse the aperture space, improving utilization of the aperture space. Wind energy is used to generate power, thereby reducing carbon emissions and improving energy conservation.

According to a first aspect, this application provides a communication apparatus. The communication apparatus includes a power generation assembly, an antenna, and a fastening assembly. The power generation assembly includes a blade and a generator. A rotating shaft of the blade is connected to the generator. The blade rotates under an action of wind energy to drive the generator to generate power. The blade, the generator, and the antenna are mounted to the fastening assembly. The fastening assembly is configured to mount the blade, the generator, and the antenna to a mounting bracket. During mounting, the antenna may be disposed around the rotating shaft of the blade. In this solution, the antenna may be deployed in a distributed manner. A middle part of the antenna may have a hollow, and a rotation axis of the blade passes through the hollow. Each part of the antenna has a small wind receiving area, and wind load of the antenna can be effectively reduced. When the wind load of the antenna is reduced, an area of an aperture of the antenna can be increased, helping to implement an extremely large antenna array (ELAA) design, and improve coverage benefits and capacity benefits of the antenna. A longer distance between the antenna and the rotation axis of the blade indicates a larger total size of the antenna, that is, more radiating element arrays may be disposed. In addition, in this embodiment of this application, the blade of the power generation assembly and the antenna may share the aperture space, to implement reuse of an aperture, save the aperture space, and improve utilization and benefits of the aperture space. In addition, the power generation assembly uses the wind energy to generate power. This can reduce carbon emissions and improve an effect of energy conservation and emission reduction.

A maximum distance between an edge that is of the antenna and that faces away from the rotation axis of the blade and the rotation axis is less than or equal to two times a rotation radius of the blade. The rotation radius refers to a distance between an edge that is of the blade and that faces away from the rotation axis and the rotation axis. Therefore, aperture space occupied by the communication apparatus is within a proper range, so that the aperture space of the antenna is not excessively large.

In addition, a minimum distance between an edge that is of the antenna and that faces the rotation axis of the blade and the rotation axis is greater than or equal to 0.5 times the rotation radius of the blade. Through experiments and simulation analysis, this solution facilitates wind to pass through the hollow in the middle of the antenna and then blow to an end of the blade. That is, the antenna does not block the wind on the end of the blade or block little wind. This helps ensure power generation efficiency of the power generation assembly.

A side that is of the antenna and that faces the rotation axis has a side surface, and an angle between the side surface and a rotation surface of the blade is greater than 90°. In this case, the side surface of the antenna is equivalent to a guiding surface of the blade, so that wind blowing to the antenna may blow to the blade under guidance of the side surface, to increase wind force on the blade, and improve the power generation efficiency of the power generation assembly.

A shape of the side surface is not limited, and may be a plane or a curved surface. The side surface may be a curved surface, to improve an air guiding effect. The curved surface may be an arc-shaped surface, a parabolic surface, or the like.

When the communication apparatus is disposed, the antenna may be disposed on a same plane as the blade, or may be disposed on a different plane from the blade. This may be designed based on a requirement. When the antenna and the blade are disposed on a same plane, it means that a projection of the blade on the rotation axis and a projection of the antenna on the rotation axis at least partially overlap. In this case, coverage of the antenna is wide, and working efficiency of the blade is high.

A shape of the antenna may be a circular ring or a regular polygonal ring. In this case, the antenna is a symmetric structure, so that the wind load on the antenna is symmetric, and the antenna is not easily damaged due to uneven force, helping to prolong a service life of the antenna.

In addition, the antenna may be a centrosymmetric structure, and a symmetric center of the antenna is located on the rotation axis of the blade. It is equivalent to describing that the blade and the antenna are concentrically disposed. When the antenna and the blade cross, the antenna and the blade are located on different planes, and the antenna blocks some wind. The antenna and the blade are concentrically disposed, and the antenna and the blade cooperate with each other, so that force on the blade is even at each position. Alternatively, when the antenna and the blade do not cross, that is, the antenna is completely disposed on an outer side of the blade.

In this case, the antenna and the blade may be disposed on a same plane, and there is no structural interference between the blade and the antenna, so that the aperture space can be used to a maximum extent, and utilization efficiency of the aperture space is improved.

When the antenna is disposed, the antenna may be an integrated structure, so that the antenna is easily mounted to the mounting bracket.

In addition, the antenna may further include at least two sub-antennas, and the at least two sub-antennas are respectively mounted to fastening assemblies through attachment members, and then mounted to the mounting bracket. Different sub-antennas may not be fastened to each other, and the sub-antennas may be separately and independently mounted to the mounting bracket. In this case, radiation directions of the sub-antennas may be respectively adjusted through the attachment members. For the antenna in this embodiment of this application, a radiation direction of each sub-antenna may be flexibly adjusted based on an actual application scenario, to enrich application scenarios of the antenna and improve a radiation range of the antenna.

When the at least two sub-antennas are disposed, the at least two sub-antennas are arranged in a ring around the rotating shaft of the blade, but adjacent sub-antennas do not need to be fastened to each other. The ring formed by the at least two sub-antennas may be a circular ring or a polygonal ring.

A shape of the sub-antenna may be a linear shape or an arc shape, which herein means a shape of an extension direction of the sub-antenna. When the sub-antenna is in a linear shape, the sub-antennas may be arranged in a polygonal ring around the rotating shaft of the blade. When the sub-antenna is in an arc shape, a circle center of the arc shape faces a direction of the rotating shaft of the blade, and the sub-antennas may be arranged in a circular ring around the rotating shaft of the blade. When the antenna includes two sub-antennas, and the two sub-antennas are arc-shaped sub-antennas respectively, and may further be semi-circular sub-antennas, the sub-antennas may be arranged in a circular ring.

The antenna includes a first radiating element array and a second radiating element array, and a working frequency band of the first radiating element array is different from a working frequency band of the second radiating element array. The antenna in the technical solution may work in different radiation frequency bands, and support communication systems of different standards.

To mount the blade and the antenna through the fastening assembly, the fastening assembly includes a fastening rod and a fastening rotating shaft. The fastening rotating shaft is coaxially connected to the fastening rod. The fastening rotating shaft and the fastening rod may be fastened relative to each other in an axial direction, and may be rotatable relative to each other in a circumferential direction. The blade is mounted to the fastening rotating shaft through fastening. In this case, when the blade rotates, the fastening rotating shaft is driven to rotate relative to the fastening rod. If the antenna is fastened to the fastening rod, rotation of the blade does not affect the antenna.

When the power generation assembly is disposed, a quantity of blades of the power generation assembly is not limited. For example, three blades or more blades may be included. A plurality of blades may be evenly distributed to improve force uniformity of the power generation assembly.

A material of the blade may be selected based on a requirement. For example, the blade may be a blade made of a metal material, to improve strength of the blade and improve a service life of the blade. Alternatively, the blade may be a blade made of a dielectric material, to reduce impact of the blade on an antenna signal.

The power generation assembly may further include a speed changing apparatus. The speed changing apparatus is connected to the rotating shaft of the blade, and is located between the blade and the generator. The speed changing apparatus is configured to adjust a rotation speed transmitted from the rotating shaft of the blade to the generator, and then transmit the rotation speed to the generator for power generation. This can make a power generation rate of the generator stable, and help improve the power generation efficiency.

The power generation assembly may further include a braking apparatus. The braking apparatus is connected to the rotating shaft of the blade, and is located between the blade and the generator. The braking apparatus is configured to brake the rotation of the blade. For example, when wind is excessively strong, to avoid damage on the blade, the blade needs to be braked, to improve the service life of the blade.

In addition, the power generation assembly may further include a power storage apparatus and a power management apparatus. The power storage apparatus is electrically connected to the generator, and is configured to store power generated by the generator. The power management apparatus is electrically connected to the power storage apparatus and the generator separately, and is configured to control the power generated by the generator to be stored in the power storage apparatus, supply power to another device connected to the generator, control a purpose of the power stored in the power storage apparatus, or the like.

The power generation assembly is electrically connected to the antenna, and is configured to supply power to the antenna. In this embodiment, power generated by the power generation assembly in the communication apparatus is directly provided to the antenna. This can reduce carbon emissions in the field of wireless communication and reduce consumption of non-renewable resources.

The fastening assembly may include a connecting rod, and the connecting rod is a hollow connecting rod. When the connecting rod is the hollow connecting rod, a weight of the fastening assembly can be reduced while it is ensured that the connecting rod has strong strength.

According to a second aspect, this application provides a base station antenna feeder system. The base station antenna feeder system includes a mounting bracket and the communication apparatus according to the first aspect. The communication apparatus is mounted to the mounting bracket. An antenna of the base station antenna feeder system has large aperture space, and coverage benefits and capacity benefits of the antenna are high. In addition, reuse of the aperture space by the antenna and the power generation assembly is implemented, improving utilization of the aperture space. Wind energy is used to generate power, reducing carbon emissions and improving an effect of energy conservation and emission reduction.

REFERENCE NUMERALS

1—Communication apparatus; 11—Antenna;
111—Radome; 112—Radiating element array;
1121—First radiating element array; 1122—Second radiating element array;
113—Reflection plate; 114—Feed network;
1141—Transmission component; 1142—Calibration network;
1143—Phase shifter; 1144—Combiner;
1145—Filter; 1146—Power splitter;
115—Side wall; 116—Sub-antenna;
1161—First sub-antenna; 11611—First end;
11612—Second end; 1162—Second sub-antenna;
11621—Third end; 11622—Fourth end;
12—Fastening assembly; 121—Fastening rod;
1211—Circular hole; 122—Fastening rotating shaft;
1221—Circular shaft; 13—Power generation assembly;
131—Blade; 1311—Rotating shaft;
1312—Rotation axis; 1313—Rotation surface;
132—Generator; 133—Speed changing apparatus;
134—Braking apparatus; 135—Power storage apparatus;
136—Power management apparatus; 14—Attachment member;
2—Mounting bracket; 3—Remote radio unit;
4—Baseband processing unit; 5—Transmission line;
r—Rotation radius; L—First distance; and
1—Second distance.

DESCRIPTION OF EMBODIMENTS

Figure 1:
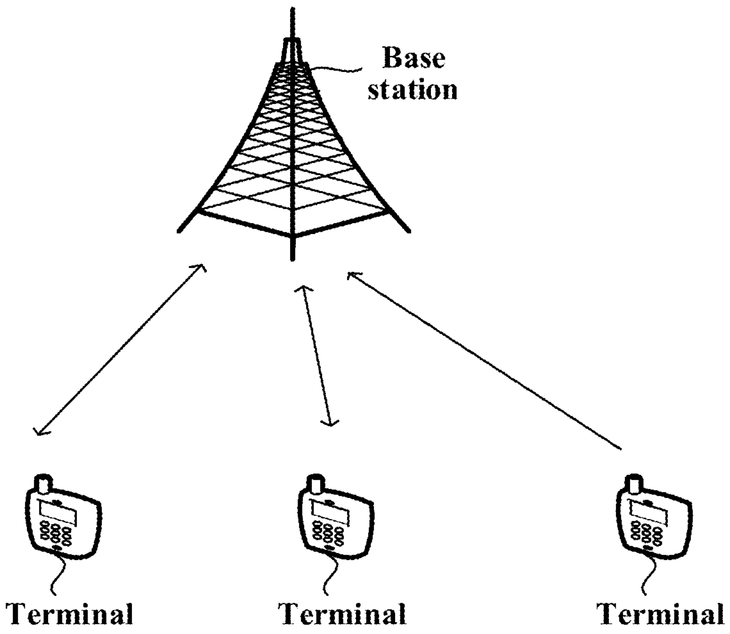
FIG. 1 is a diagram of a system architecture to which an embodiment of this application is applicable.

To facilitate understanding of a communication apparatus and a base station antenna feeder system provided in embodiments of this application, the following describes an application scenario of the communication apparatus and the base station antenna feeder system. FIG. 1 is a diagram of a system architecture to which an embodiment of this application is applicable. As shown in FIG. 1, the application scenario may include a base station antenna feeder system and a terminal. Wireless communication may be implemented between the base station antenna feeder system and the terminal. The base station antenna feeder system may be also referred to as an access network device, may be located in a base station subsystem (BSS), a terrestrial radio access network (UTRAN), or an evolved terrestrial radio access network (E-UTRAN), and is configured to perform cell coverage of a signal, to implement communication between the terminal device and a wireless network. The base station antenna feeder system may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB, or eNodeB) in a long term evolution (LTE) system, or may be a radio controller in a cloud radio access network (CRAN) scenario. Alternatively, the base station antenna feeder system may be a relay station, an access point, a vehicle-mounted device, a wearable device, a gNodeB (gNB) in a new radio (NR) system, an access network device in a future evolved network, or the like. This is not limited in embodiments of this application.

Figure 2:
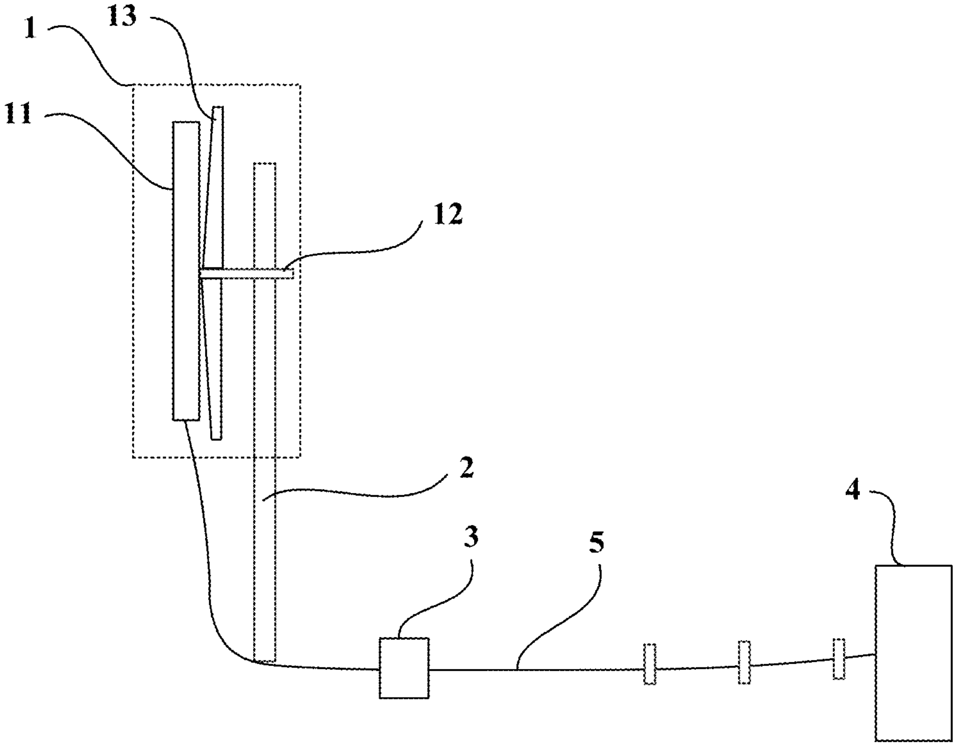
FIG. 2 is a diagram of a possible structure of a base station antenna feeder system according to an embodiment of this application.

A base station is equipped with an antenna to implement signal transmission in space. FIG. 2 is a diagram of a possible structure of a base station antenna feeder system according to an embodiment of this application. As shown in FIG. 2, the base station antenna feeder system may usually include structures such as a communication apparatus 1 and a mounting bracket 2. The communication apparatus 1 may include an antenna 11, a fastening assembly 12, and a power generation assembly 13. The antenna 11 and the power generation assembly 13 may be mounted to the mounting bracket 2 through the fastening assembly 12, to facilitate signal receiving or transmitting of the antenna 11 of the communication apparatus 1, and the power generation assembly uses wind energy to generate power. The mounting bracket 2 may be a pole, an iron tower, or the like. FIG. 2 shows only one example of components that may be included in the base station antenna feeder system and a position relationship between the components. The base station antenna feeder system may include other components, or a position relationship between the components is different from the position relationship shown in FIG. 2.

In an embodiment, the antenna 11 may further include a radome 111. The radome 111 has a good electromagnetic wave penetration characteristic in terms of electrical performance, and can withstand impact of an external harsh environment in terms of mechanical performance, so that the communication apparatus 1 can be protected from the impact of the external environment.

In addition, the base station antenna feeder system may further include a remote radio unit 3 and a baseband processing unit 4. As shown in FIG. 2, the baseband processing unit 4 may be connected to the antenna 11 through the remote radio unit 3. The baseband processing unit 4 may be connected to a feed network of the communication apparatus 1 through the remote radio unit 3. In some implementations, the remote radio unit 3 may also be referred to as a remote radio unit (RRU), and the baseband processing unit 4 may also be referred to as a baseband unit (BBU).

In a possible embodiment, as shown in FIG. 2, both the remote radio unit 3 and the baseband processing unit 4 may also be located at a remote end of the antenna 11. The remote radio unit 3 and the baseband processing unit 4 may be connected through a transmission line 5. It should be noted that FIG. 2 shows only an example of a position relationship between the remote radio unit 3 and the antenna 11.

Figure 3:
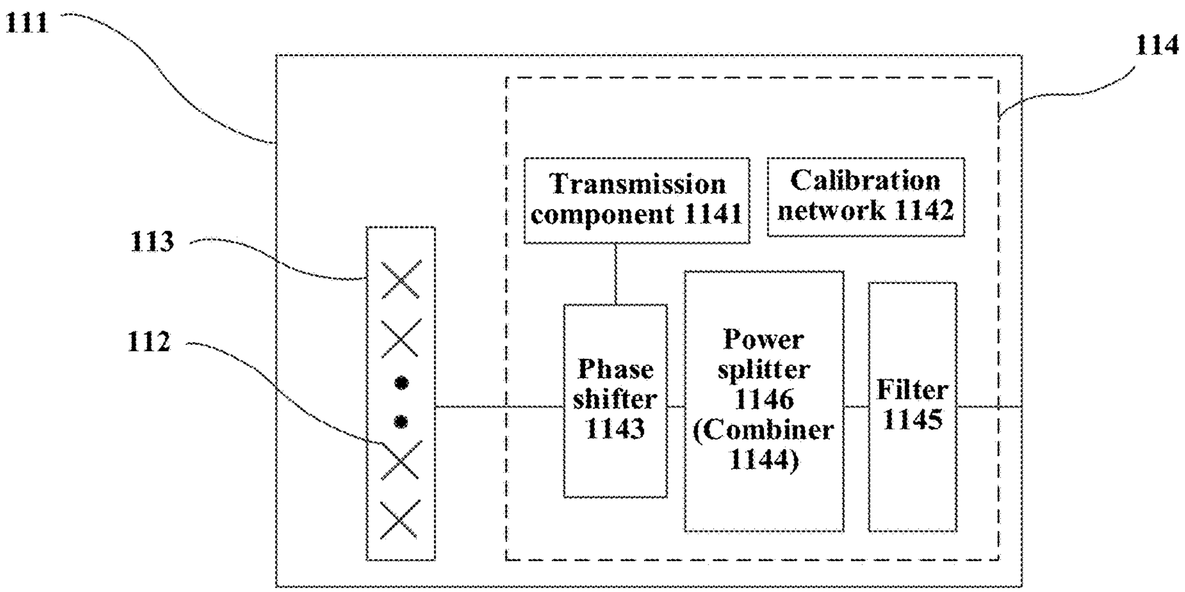
FIG. 3 is a diagram of an antenna according to an embodiment of this application.

Refer to FIG. 2 and FIG. 3 together. FIG. 3 is a diagram of an antenna according to a possible embodiment of this application. As shown in FIG. 3, the antenna 11 may include a radiating element array 112 and a reflection plate 113. The radiating element array 112 may also be referred to as an antenna element, an element, or the like, and can effectively send or receive an antenna signal. In the antenna 11, frequencies of different radiating element arrays 112 may be the same or different. The reflection plate 113 may also be referred to as a bottom plate, an antenna panel, a reflection surface, or the like, and may be made of a metal material. When the antenna 11 receives a signal, the reflection plate 113 may reflect and aggregate the signal to the antenna 11 at a reception point. The radiating element array 112 is usually placed on one side of the reflection plate 113. This not only can greatly enhance a signal receiving or transmitting capability of the antenna 11, but also can block and shield an interference signal from a back surface of the reflection plate 113 (in this application, the back surface of the reflection plate 113 is a side opposite to a side that is of the reflection plate 113 and that is used to dispose the radiating element array 112).

In the antenna 11, a feed network 114 is located between the radiating element array 112 and a power amplifier of the remote radio unit 3. The feed network 114 may provide a power and a phase for the radiating element array 112. For example, the feed network 114 may include a power splitter 1146 (or a combiner 1144) that can be used in a forward direction or in a reverse direction, and is configured to divide one signal into a plurality of signals or combine a plurality of signals into one signal. The feed network 114 may further include a filter 1145, configured to filter out an interference signal. For a remote electrical tilt antenna, the feed network 114 may further include a transmission component 1141 to implement different radiation beam directions, and a phase shifter 1143 to change a signal radiation maximum direction. In some cases, the phase shifter 1143 further has a function of the power splitter 1146 (or the combiner 1144). In this case, the power splitter 1146 (or the combiner 1144) may be omitted in the feed network. In some embodiments, the feed network 114 may further include a calibration network 1142, to obtain a required calibration signal. Different components included in the feed network 114 may be connected through a transmission line and a connector. It should be noted that the power splitter 1146 (or the combiner 1144) may be located inside or outside the radome 111, and a connection relationship between different components mentioned above is not unique. FIG. 3 shows only one possible position relationship and connection manner of the components.

Figure 4:
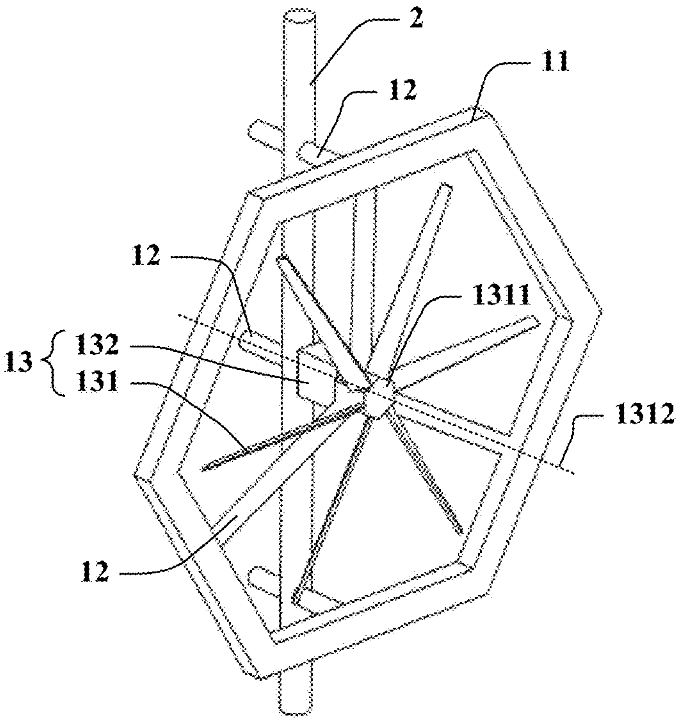
FIG. 4 is a diagram of a three-dimensional structure of a communication apparatus according to an embodiment of this application.
Figure 5:
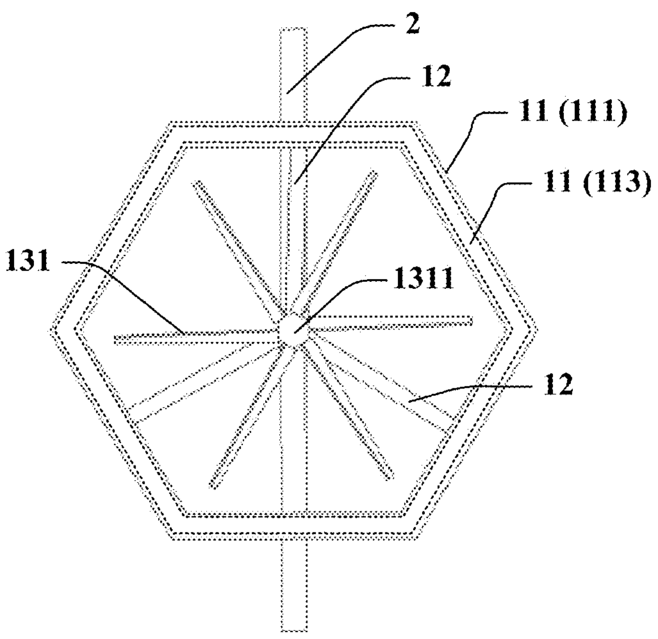
FIG. 5 is a diagram of a front structure of a communication apparatus according to an embodiment of this application.
Figure 6:
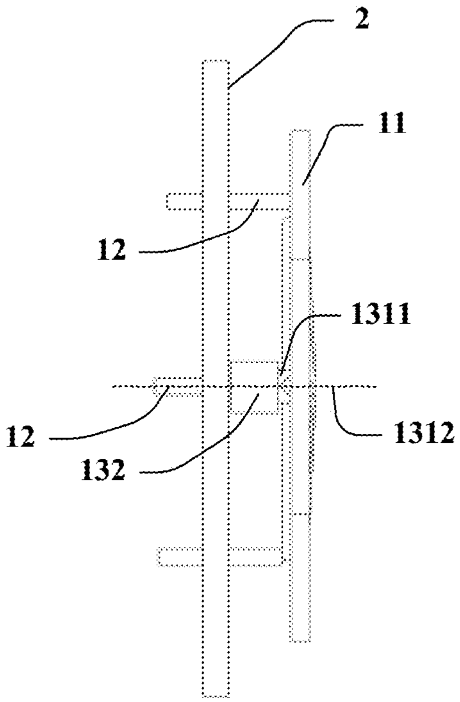
FIG. 6 is a diagram of a side structure of a communication apparatus according to an embodiment of this application.

FIG. 4 is a diagram of a three-dimensional structure of a communication apparatus according to an embodiment of this application. FIG. 5 is a diagram of a front structure of a communication apparatus according to an embodiment of this application. FIG. 6 is a diagram of a side structure of a communication apparatus according to an embodiment of this application. As shown in FIG. 4 to FIG. 6, in an embodiment, a communication apparatus 1 includes a power generation assembly 13, an antenna 11, and a fastening assembly 12. The power generation assembly 13 may include a blade 131 and a generator 132. A rotating shaft 1311 of the blade 131 is connected to the generator 132. The blade 131 rotates under an action of wind force, and the rotating shaft 1311 rotates synchronously with the blade 131. In this case, the rotating shaft 1311 may be used to transfer kinetic energy generated by rotation of the blade 131 to the generator 132, to drive a rotor of the generator 132 to rotate, so that the generator 132 generates power, to implement a wind power generation function of the power generation assembly 13. The blade 131, the generator 132, and the antenna 11 are mounted to the fastening assembly 12. Then the blade 131, the generator 132, and the antenna 11 are mounted to a mounting bracket 2 through the fastening assembly 12. Because a size of the blade 131 is large, the antenna 11 may have large disposing space. The antenna 11 is disposed on a peripheral side of the rotating shaft 1311 of the blade 131, that is, the antenna 11 is disposed around the rotating shaft 1311. In this solution, the antenna 11 may not be in a regular cube structure. The antenna 11 may be composed of a plurality of parts, or have a structure such as a ring, so that the antenna 11 can be deployed in a distributed manner. A middle part of the antenna 11 may have a hollow, and a rotation axis 1312 of the blade 131 passes through the hollow of the antenna. In conventional technology, when the antenna 11 is in the shape of a regular cube, the antenna 11 has an entire wind receiving surface, and a wind receiving area is large. However, in embodiments of this application, the antenna 11 is deployed in the distributed manner on the peripheral side of the rotating shaft 1311 of the blade 131, so that an entire wind receiving surface is divided into a plurality of small wind receiving surfaces. Therefore, each part of the antenna 11 has a small wind receiving area, effectively reducing wind load of the antenna 11. When the wind load of the antenna 11 is reduced, an area of an aperture of the antenna 11 can be increased, helping to implement a design of an extremely large antenna array (ELAA), and improve coverage and capacity benefits of the antenna 11. A longer distance between the antenna 11 and the rotation axis 1312 (as shown in FIG. 4) of the blade 131 indicates a larger total size of the antenna 11, that is, more radiating element arrays 112 may be disposed. In addition, in embodiments of this application, the blade 131 of the power generation assembly 13 and the antenna 11 may share the aperture space, to implement reuse of an aperture, save the aperture space, and improve utilization and benefits of the aperture space. In addition, the power generation assembly 13 uses wind energy to generate power. Because the wind energy is clean energy, carbon emissions can be reduced and energy conservation is improved.

When the communication apparatus 1 is disposed, the antenna 11 may be disposed on a same plane as the blade 131, or may be disposed on a different plane from the blade 131. This may be designed based on a requirement. In the embodiments shown in FIG. 4 to FIG. 6, it may be considered that the antenna 11 and the blade 131 are located on a same plane. In this case, the antenna 11 needs not to interfere with the rotation of the blade 131, to ensure that the blade 131 can rotate normally. That is, in an implementation, an inner side edge that is of the antenna 11 and that faces the blade 131 needs to be completely located on an outer side of the blade 131. It should be noted that, that the antenna 11 and the blade 131 are disposed on the same plane means that the antenna 11 and the blade 131 are approximately located on the same plane, or that the plane has a thickness, but does not mean that the antenna 11 and the blade 131 are absolutely disposed on the same plane. For example, both the antenna 11 and the blade 131 have a thickness along an extension direction of the rotation axis 1312 of the blade 131. As long as a projection of the blade 131 on the rotation axis 1312 and a projection of the antenna 11 on the rotation axis 1312 at least partially overlap, it may be considered that the antenna 11 and the blade 131 are located on a same plane.

Figure 7:
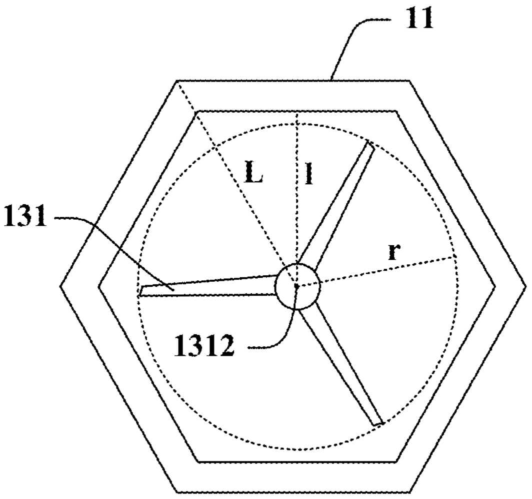
FIG. 7 is another diagram of a front structure of a communication apparatus according to an embodiment of this application.

FIG. 7 is another diagram of a front structure of a communication apparatus according to an embodiment of this application. As shown in FIG. 7, to describe a position relationship between an antenna 11 and a blade 131 in this embodiment of this application, a distance between an edge that is of the blade 131 and that faces away from a rotation axis 1312 and the rotation axis 1312 is a rotation radius r of the blade 131. Because an edge that is of the antenna 11 and that faces away from the rotation axis 1312 may be irregular, and distances between different edges of the antenna 11 and a rotating shaft are different, a maximum distance between the edge that is of the antenna 11 and that faces away from the rotation axis 1312 and the rotation axis 1312 is a first distance L. Because an edge that is of the antenna 11 and that faces the rotation axis 1312 may be irregular, and the distances between the different edges of the antenna 11 and the rotating shaft are different, a minimum distance between the edge that is of the antenna 11 and that faces the rotation axis 1312 and the rotation axis 1312 is a second distance 1.

With reference to FIG. 4 to FIG. 7, when the antenna 11 and the blade 131 are disposed on a same plane, it needs to be ensured that the antenna 11 and the blade 131 do not have structural interference. That is, the antenna 11 is disposed on a peripheral side of the blade 131. The second distance 1 needs to be greater than the rotation radius r, so that the blade 131 rotates in a hollow structure in the antenna 11. In this solution, a size of the antenna 11 may be increased, so that a large quantity of radiating element arrays 112 are disposed, thereby helping improve a gain of the antenna 11. The antenna 11 may further not block wind of the blade 131, so that power generation efficiency of the power generation assembly 13 is improved.

Figure 8:
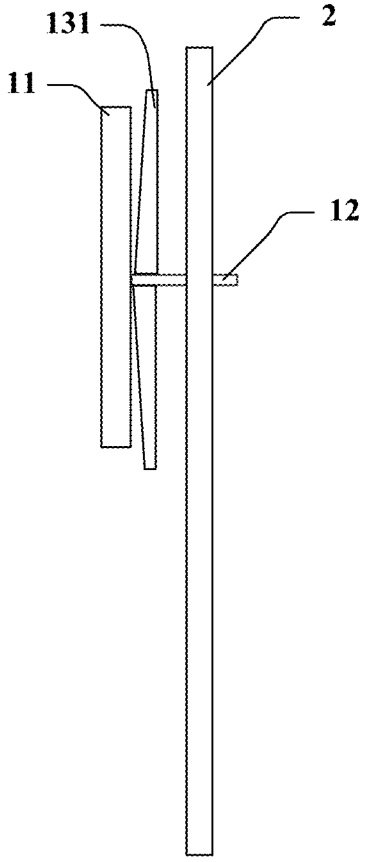
FIG. 8 is another diagram of a side structure of a communication apparatus according to an embodiment of this application.
Figure 9:
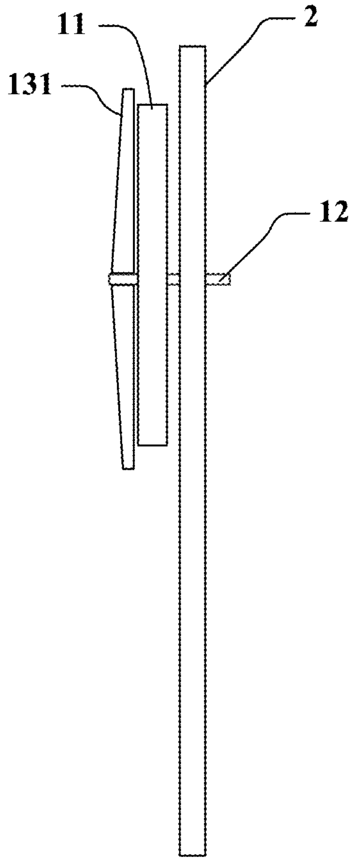
FIG. 9 is another diagram of a side structure of a communication apparatus according to an embodiment of this application.

FIG. 8 and FIG. 9 are other two diagrams of a side structure of a communication apparatus according to embodiments of this application. As shown in FIG. 8 and FIG. 9, in some embodiments, an antenna 11 and a blade 131 may be disposed on different planes. In some embodiments, the antenna 11 may be disposed on a side that is of the blade 131 and that faces away from a mounting bracket 2, as shown in FIG. 8. In some embodiments, the antenna 11 may be alternatively disposed on a side that is of the blade 131 and that faces the mounting bracket 2, as shown in FIG. 9. It should be noted that the embodiments shown in FIG. 8 and FIG. 9 are both embodiments in which the foregoing second distance 1 is less than the rotation radius r. However, during actual application, when the antenna 11 and the blade 131 are disposed on different planes, the second distance 1 may alternatively be greater than or equal to the rotation radius r. This is not limited in this application.

In some embodiments, when the antenna 11 and the blade 131 are disposed on different planes, the second distance 1 may be less than the rotation radius r, as shown in FIG. 8 and FIG. 9. This helps reduce aperture space occupied by the communication apparatus 1. It can be learned through experiments and simulation analysis that when the second distance 1 is greater than or equal to 0.5 times the rotation radius r, power generation efficiency of a power generation assembly 13 can be improved. Because a region in which the blade 131 is farther away from the rotation axis 1312 has higher efficiency of converting wind energy into electric energy, a wind receiving effect of an end that is of the blade 131 and that faces away from the rotation axis 1312 needs to be ensured.

In addition, when the antenna 11 is disposed, the first distance L may alternatively be less than or equal to two times the rotation radius r. Therefore, the aperture space occupied by the communication apparatus 1 is within a proper range. With same wind load, a larger first distance L indicates a larger total volume of the antenna 11 that can be disposed, which is more conducive to implementing an extremely large antenna array. A smaller first distance L indicates smaller aperture space occupied by the communication apparatus 1, which is more conducive to saving the aperture space. In conclusion, a value of the first distance L may be optimized based on an actual requirement.

Figure 10:
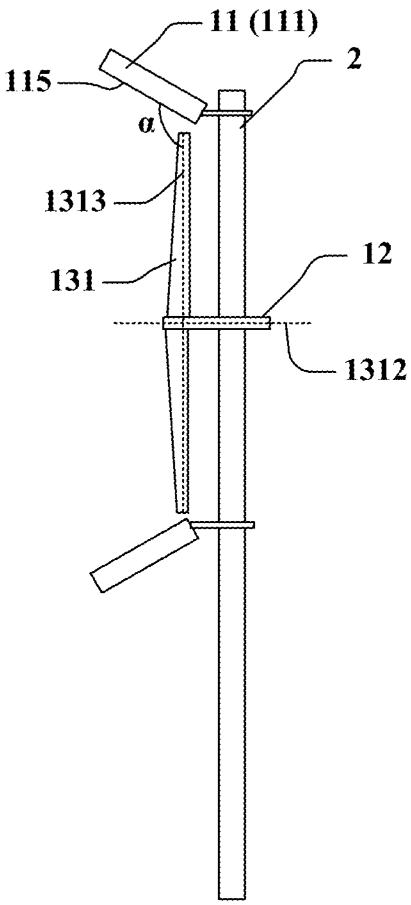
FIG. 10 is a side sectional view of a communication apparatus according to an embodiment of this application.

FIG. 10 is a side sectional view of a communication apparatus according to an embodiment of this application. As shown in FIG. 10, in an embodiment, the foregoing antenna 11 has a side surface 115 facing a rotation axis 1312. When the antenna 11 has a radome 111, the side surface 115 is a side surface 115 that is of the radome 111 and that faces the rotation axis 1312. In a rotation process of a blade 131, a path that the blade 131 passes through forms a rotation surface 1313 of the blade 131. If an angle $\alpha$ between the side surface 115 and the rotation surface 1313 is greater than 90°, wind blowing to the antenna 11 may blow to the blade 131 under guidance of the side surface 115, to increase wind force on the blade 131, and improve power generation efficiency of a power generation assembly 13.

A shape of the side surface 115 is not limited, and may be, in some embodiments a plane or a curved surface. The side surface 115 may be a curved surface, to improve an air guiding effect, so that wind guided to the blade 131 is strong, to improve the power generation efficiency. The curved surface may be an arc-shaped surface, a parabolic surface, or the like.

When the antenna 11 is disposed, as shown in FIG. 4 to FIG. 6, the antenna 11 in the communication apparatus 1 may be an integrated structure, so that the antenna 11 is easily mounted. An implementation in which the antenna 11 is the integrated structure is not limited. For example, the reflection plate 113 of the antenna 11 may be a reflection plate 113 of an integrated structure, such as a ring reflection plate 113 (as shown by dashed lines in FIG. 5). Alternatively, the antenna 11 may further have a radome 111, where the radome 111 is integrated. Alternatively, the antenna 11 may further include different sub-antennas 116, and the different sub-antennas 116 are fastened to each other, so that the antenna 11 is fastened into an integrated structure, the different sub-antennas can be mounted at the same time, simplifying a mounting process of the antenna 11.

In some embodiments, a shape of the antenna 11 of the communication apparatus 1 may be designed as a ring. However, a specific shape of the ring of the antenna 11 is not limited. For example, the shape may be a circular ring, a polygonal ring, or an irregular ring antenna 11. This is not limited in this application. In addition, shapes of an inner edge and an outer edge of the ring of the antenna 11 may be the same or may be different. For example, either of the inner edge and the outer edge of the antenna 11 may be in the shape of a circle, or the inner edge of the antenna 11 may be of a circle, and the outer edge may be of a polygon. Examples are not listed one by one herein.

Refer to embodiments in FIG. 4 to FIG. 6. The antenna 11 is a symmetric structure. For example, the shape of antenna 11 may be a circular ring or a regular polygonal ring. In this way, the wind load on the antenna 11 is symmetric, and the antenna 11 is not easily damaged due to uneven force, helping to prolong a service life of the antenna 11. In addition, when the antenna 11 is a centrosymmetric structure, a symmetric center of the antenna 11 is located on the rotation axis 1312 of the blade 131. It is equivalent to describing that the blade 131 and the antenna 11 are concentrically disposed. When the antenna 11 and the blade 131 cross, the antenna 11 and the blade 131 are located on different planes, and the antenna 11 blocks some wind. The antenna 11 and the blade 131 are concentrically disposed, and the antenna 11 and the blade 131 cooperate with each other, so that force on the blade 131 is even at each position. Alternatively, when the antenna 11 and the blade 131 do not cross, that is, the antenna 11 is completely disposed on an outer side of the blade 131. In this case, the antenna 11 and the blade 131 may be disposed on a same plane, and there is no structural interference between the blade 131 and the antenna 11, so that aperture space can be used to a maximum extent, and utilization efficiency of the aperture space is improved.

Figure 11:
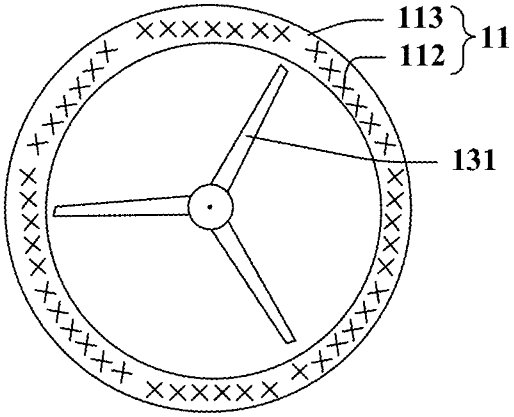
FIG. 11 is another diagram of a front structure of a communication apparatus according to an embodiment of this application.

FIG. 11 is another diagram of a front structure of a communication apparatus according to an embodiment of this application. As shown in FIG. 11, when a shape of the foregoing antenna 11 is set to a ring in an implementation, the antenna 11 may include a ring-shaped reflection plate 113, and a radiating element array 112 is disposed on the ring-shaped reflection plate 113, to form the foregoing ring-shaped antenna 11.

Alternatively, in another possible embodiment, the ring-shaped antenna 11 may alternatively include a plurality of independent reflection plates 113. The reflection plates 113 are fastened end to end in sequence to form a ring, and each reflection plate 113 is correspondingly disposed with a radiating element array 112, to form the foregoing ring-shaped antenna 11. The reflection plate 113 may be an arc-shaped strip reflection plate 113, so that a circular ring-shaped antenna 11 may be formed. The reflection plate 113 may alternatively be a linear strip reflection plate 113, so that a polygonal ring-shaped antenna 11 may be formed, as shown in FIG. 4 to FIG. 6. Specific forms of the ring-shaped antenna 11 are not listed one by one herein. It should be noted that, in some embodiments, for a correspondence between the reflection plate 113 and the radiating element array 112, one reflection plate 113 may be disposed with a plurality of different radiating element arrays 112, or one reflection plate 113 may be disposed with one radiating element array 112, or one radiating element array 112 may be disposed on one reflection plate 113, or one radiating element array 112 may be disposed on at least two reflection plates 113. This is not limited in this application.

In other embodiments, the antenna 11 may alternatively be designed as a ring-shaped antenna 11 with an opening. This is not limited in this application. In other words, the antenna 11 does not necessarily form a closed ring-shaped structure around a rotating shaft 1311 of a blade 131.

Figure 12:
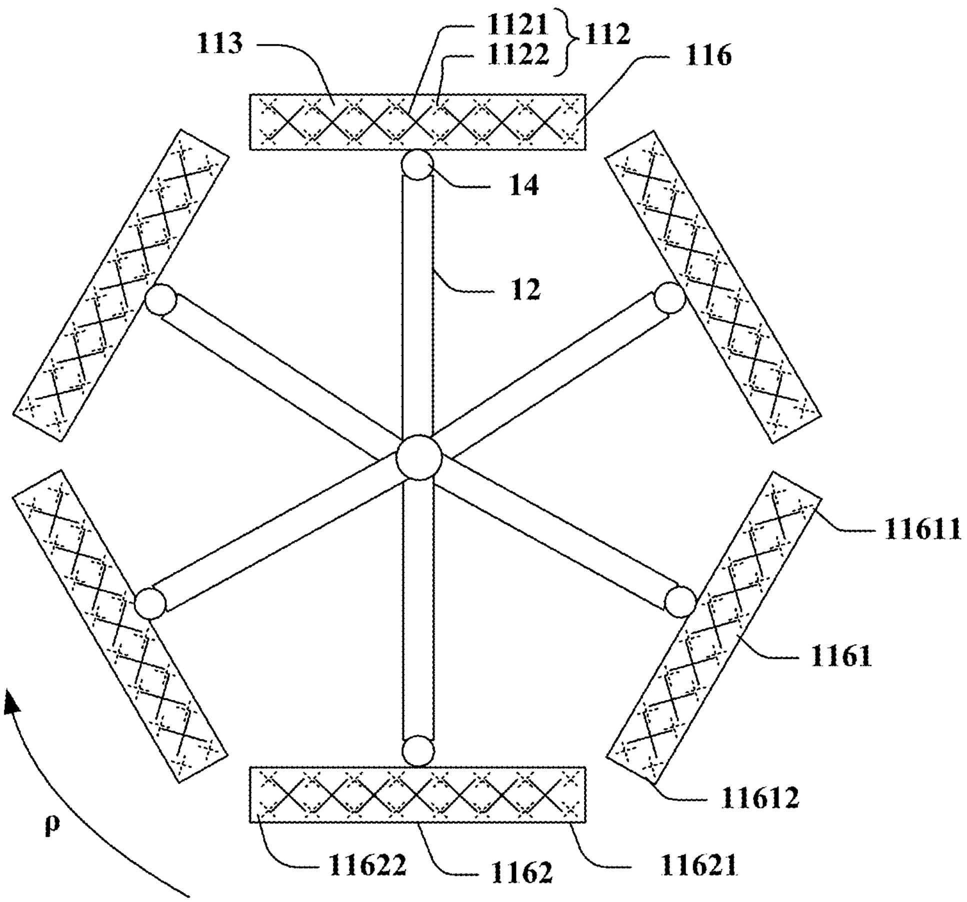
FIG. 12 is a diagram of a front structure of an antenna and a fastening assembly according to an embodiment of this application.

FIG. 12 is a diagram of a front structure of a connection relationship between an antenna and a fastening assembly according to an embodiment of this application. As shown in FIG. 12, in some embodiments, the antenna 11 may include at least two sub-antennas 116, and the at least two sub-antennas 116 are respectively mounted to fastening assemblies 12 through attachment members 14, and then mounted to a mounting bracket 2. The sub-antennas 116 are not fastened to each other, and the sub-antennas 116 are independently mounted to the mounting bracket. In this case, radiation directions of the sub-antennas 116 may be respectively adjusted through the attachment members 14. For the antenna 11 in this embodiment of this application, a radiation direction of each sub-antenna may be flexibly adjusted based on an actual application scenario, to enrich application scenarios of the antenna 11 and improve a radiation range of the antenna 11. In some embodiments, the attachment member 14 may be a bolt, a mounting hole, and a plurality of bolt holes. The bolt is connected to the mounting hole and one of the plurality of bolt holes, to connect the sub-antenna 116 and the fastening assembly 12 with the bolt. The radiation direction of the sub-antenna 116 may be adjusted by adjusting the bolt hole connected to the mounting hole. The plurality of bolt holes may be located in the sub-antenna 116, and in this case, the mounting hole is located in the fastening assembly 12. Alternatively, the plurality of bolt holes may be located in the fastening assembly 12, and in this case, the mounting hole is located in the sub-antenna. In other embodiments, the attachment member 14 may alternatively be a gear assembly or the like. Details are not described in this application.

In some embodiments, each sub-antenna 116 has a reflection plate 113 and a radiating element array 112 disposed on the reflection plate 113. In this case, adjusting the radiation direction of the sub-antenna 116 is adjusting directions of the reflection plate 113 and the radiating element array 112 of the sub-antenna 116.

As shown in FIG. 12, the at least two sub-antennas 116 may be disposed close to a peripheral side of a rotating shaft 1311 of a blade 131 end to end in sequence. That is, the at least two sub-antennas 116 are arranged in a ring around the rotating shaft 1311 of the blade 131, but adjacent sub-antennas 116 do not need to be fastened to each other. The at least two sub-antennas 116 may include a first sub-antenna 1161 and a second sub-antenna 1162 that are adjacent to each other. Two ends of the first sub-antenna 1161 are a first end 11611 and a second end 11612 that are arranged along a first direction ρ, and two ends of the second sub-antenna 1162 are a third end 11621 and a fourth end 11622 that are arranged along the first direction ρ. The second end 11612 is close to the third end 11621, so that the at least two sub-antennas 116 are arranged in the ring. The first sub-antenna 1161 and the second sub-antenna 1162 may be spaced at a distance along the first direction ρ. Alternatively, the first sub-antenna 1161 and the second sub-antenna 1162 may overlap to an extent along the first direction ρ. However, a radiating element array 112 of the first sub-antenna 1161 and a radiating element array 112 of the second sub-antenna 1162 need not overlap, to ensure communication quality of the antenna 11. The first direction ρ may be a rotation direction of the blade, or may be opposite to the rotation direction of the blade. This is not limited in this application.

In the foregoing embodiments, a shape of the sub-antenna 116 may be an arc shape, which herein means that an extension direction (a length direction) of the sub-antenna 116 is arc-shaped. The reflection plate 113 may be arc-shaped. In this case, a circle center of the arc-shaped sub-antenna 116 faces a rotation axis 1312 of the blade 131. The circle center may be located on the rotation axis 1312. In this case, the sub-antennas 116 may form a circular ring around the rotating shaft 1311 of the blade 131. The shape of the sub-antenna 116 may alternatively be a linear shape, which herein means that the extension direction (the length direction) of the sub-antenna 116 is a straight line. In this case, the reflection plate 113 may alternatively be a linear strip reflection plate 113, and the sub-antennas 116 may form a polygonal ring around the rotating shaft 1311 of the blade 131. Structure forms formed by the plurality of sub-antennas 116 are not listed one by one herein. It should be noted that, for a correspondence between the reflection plate 113 and the radiating element array 112, for example, one reflection plate 113 may be disposed with a plurality of different radiating element arrays 112, or one reflection plate 113 is disposed with one radiating element array 112, or one radiating element array 112 is disposed on one reflection plate 113, or one radiating element array 112 is disposed on at least two reflection plates 113. This is not limited in this application.

Still referring to FIG. 12, the antenna 11 may include a first radiating element array 1121 and a second radiating element array 1122, and a working frequency band of the first radiating element array 1121 is different from a working frequency band of the second radiating element array 1122. The antenna 11 in some embodiments may work in different radiation frequency bands, and support communication systems of different standards, for example, support communication of a time division duplex or frequency division duplex standard. FIG. 12 is only used as an example for description herein. However, in the embodiments shown in FIG. 4 to FIG. 6, when the antenna 11 is the integrated structure, the antenna may also include the first radiating element array 1121 and the second radiating element array 1122, and the working frequency band of the first radiating element array 1121 is different from the working frequency band of the second radiating element array 1122.

Figure 13:
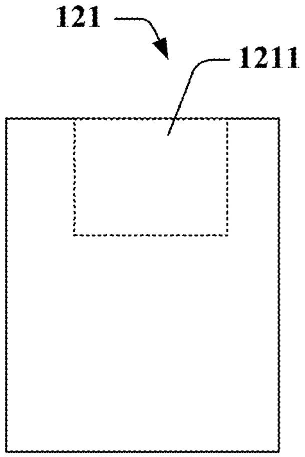
FIG. 13 is a diagram of a structure of a fastening rod according to an embodiment of this application.
Figure 14:
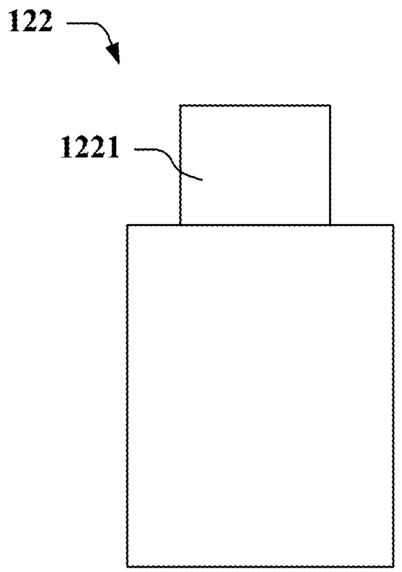
FIG. 14 is a diagram of a structure of a fastening rotating shaft according to an embodiment of this application.
Figure 15:
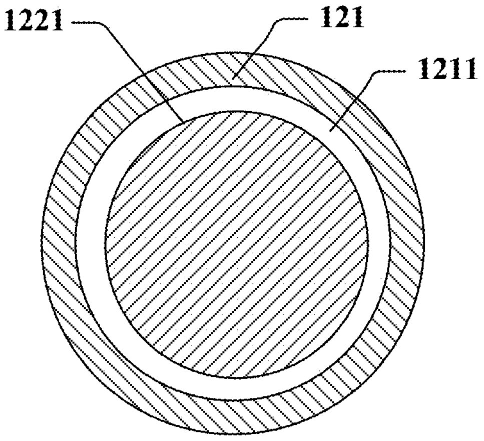
FIG. 15 is a diagram of a partial cross-sectional structure of a fastening assembly according to an embodiment of this application.

FIG. 13 is a diagram of a structure of a fastening rod according to an embodiment of this application. FIG. 14 is a diagram of a structure of a fastening rotating shaft according to an embodiment of this application. FIG. 15 is a diagram of a partial cross-sectional structure of a fastening assembly according to an embodiment of this application. As shown in FIG. 13 to FIG. 15, the fastening assembly 12 may include a fastening rod 121 and a fastening rotating shaft 122, and the fastening rod 121 is rotatably connected to the fastening rotating shaft 122. The fastening rod 121 and the fastening rotating shaft 122 may be sleeved. The fastening rod 121 and the fastening rotating shaft 122 are rotatable relative to each other in a circumferential direction, and are fastened relative to each other in an axial direction. For example, as shown in FIG. 13, the fastening rod 121 may have a circular hole 1211 for mounting the fastening rotating shaft 122. As shown in FIG. 14, the fastening rotating shaft 122 may have a circular shaft 1221 that adapts to the circular hole 1211. As shown in FIG. 15, the circular shaft 1221 of the fastening rotating shaft 122 is disposed in the circular hole 1211 of the fastening rod 121, so that the fastening rotating shaft 122 rotates relative to the fastening rod 121.

In another embodiment, the fastening rod 121 may have a circular shaft for mounting the fastening rotating shaft 122, the fastening rotating shaft 122 has a circular hole that adapts to the circular shaft, and the circular shaft of the fastening rod 121 is disposed in the circular hole of the fastening rotating shaft 122, so that the fastening rotating shaft 122 rotates relative to the fastening rod 121.

In addition, a fitting for use in cooperation such as a bearing may be disposed between the fastening rod 121 and the fastening rotating shaft 122. This is not limited in this application.

In an embodiment, the fastening rod 121 may be mounted to a mounting bracket 2 through fastening, and a blade 131 may be mounted to the fastening rotating shaft 122 through fastening. In this case, when the blade 131 rotates, driven by wind energy, the fastening rotating shaft 122 is driven to rotate relative to the fastening rod 121, that is, rotate relative to the mounting bracket 2. A specific manner in which the blade 131 is mounted to the fastening rotating shaft 122 through fastening is not limited. The blade 131 may be directly fastened to the fastening rotating shaft 122, or the fastening rotating shaft 122 may be fastened to the blade 131 through another structure such as a connecting rod. An antenna 11 is mounted to the fastening rod 121 through fastening, so that the antenna 11 may be fastened relative to the mounting bracket 2, and is not affected by rotation of the blade 131. A specific manner in which the antenna 11 is mounted to the fastening rod 121 through fastening is not limited. The antenna 11 may be directly fastened to the fastening rod 121, or the fastening rod 121 may be fastened to the antenna 11 through another structure such as a connecting rod.

In addition, it may be understood that the fastening assembly 12 may include a plurality of parts, for example, a first part that is rotatably connected to the blade 131, a second part that is connected to the antenna 11, and a third part that is connected to the first part and the second part. The foregoing parts may include a connecting rod, and the connecting rod is a hollow connecting rod. When the connecting rod is the hollow connecting rod, a weight of the fastening assembly 12 can be reduced while it is ensured that the connecting rod has strong strength.

In an embodiment, a shape of a cross section of the hollow connecting rod may be square-shaped, 2×1 grid-shaped, 2×2 grid-shaped, circular, elliptical, or the like.

In the embodiment shown in FIG. 11, a power generation assembly 13 includes three blades 131. In another embodiment, the power generation assembly 13 may further include more blades 131. In the embodiment shown in FIG. 4, the power generation assembly 13 includes six blades 131. This is not limited in this application. In addition, the blades 131 of the power generation assembly 13 may be evenly distributed on a peripheral side of a rotating shaft 1311 of the blades 131, to improve force uniformity of the power generation assembly 13 and improve a power generation effect.

Selection of a material of the blade 131 is not limited in this application. In an embodiment, the blade 131 may be made of a dielectric material, to reduce impact of the blade 131 on a radiation signal of the antenna 11. In some embodiments, the blade 131 may be made of a metal material, to improve the strength and service life of the blade 131.

The power generation assembly 13 may be electrically connected to the antenna 11, and is configured to supply power to the antenna 11. The power generation assembly 13 may supply power to a feed network of the antenna 11. In this embodiment, power generated by the power generation assembly 13 in a communication apparatus 1 is directly provided to the antenna 11, so that a loss of the power in a storage and transmission process can be reduced, and utilization of the power generated by the power generation assembly 13 can be improved. In addition, dependence of the communication apparatus on other power can be reduced, power supplied from a remote end to the antenna 11 is reduced, and a loss of this part of the power in a transmission process is reduced. In conclusion, such a design can reduce carbon emissions and consumption of non-renewable resources in the field of wireless communication.

In addition, the power generation assembly 13 may further include a speed changing apparatus. The speed changing apparatus is connected to the rotating shaft 1311 of the blade 131, and is configured to adjust a rotation speed of the blade 131, and then transmit the rotation speed to a generator 132 for power generation. This solution can make a power generation rate of the generator 132 stable, and help improve power generation efficiency.

Figure 16:
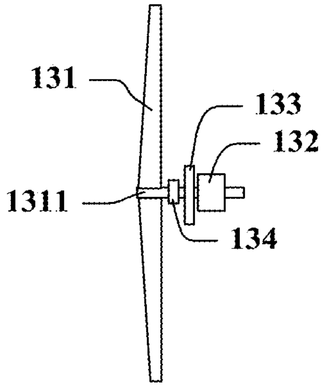
FIG. 16 is a diagram of a structure of a power generation assembly according to an embodiment of this application.

FIG. 16 is a diagram of a structure of a power generation assembly according to an embodiment of this application. As shown in FIG. 16, the power generation assembly 13 may further include a speed changing apparatus 133. The speed changing apparatus 133 is connected to a rotating shaft 1311 of a blade 131, and is configured to adjust a rotation speed of the blade 131, and then transmit the rotation speed to a generator 132 for power generation. This solution can make a power generation rate of the generator 132 stable, and help improve power generation efficiency.

Still refer to FIG. 16. In another embodiment, the power generation assembly 13 may further include a braking apparatus 134. The braking apparatus 134 is connected to the rotating shaft 1311 of the blade 131, and is configured to brake rotation of the blade 131. For example, when wind is excessively strong, to avoid damage on the blade 131, the blade 131 needs to be braked, to improve a service life of the blade 131.

Figure 17:
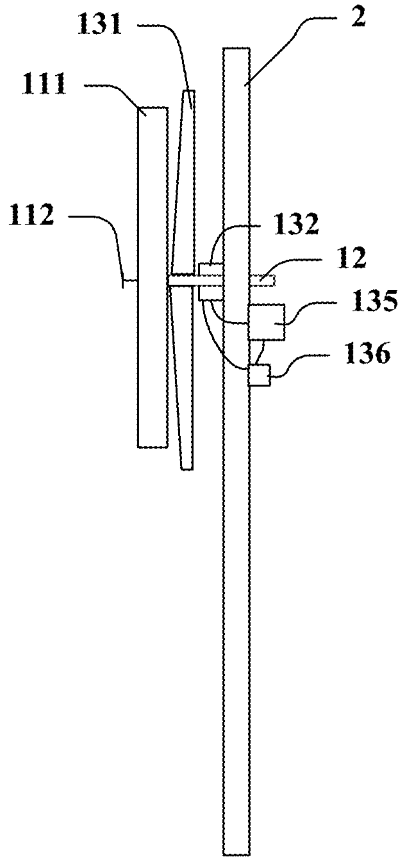
FIG. 17 is a diagram of a possible structure of a base station antenna feeder system according to an embodiment of this application.
Figure 18:
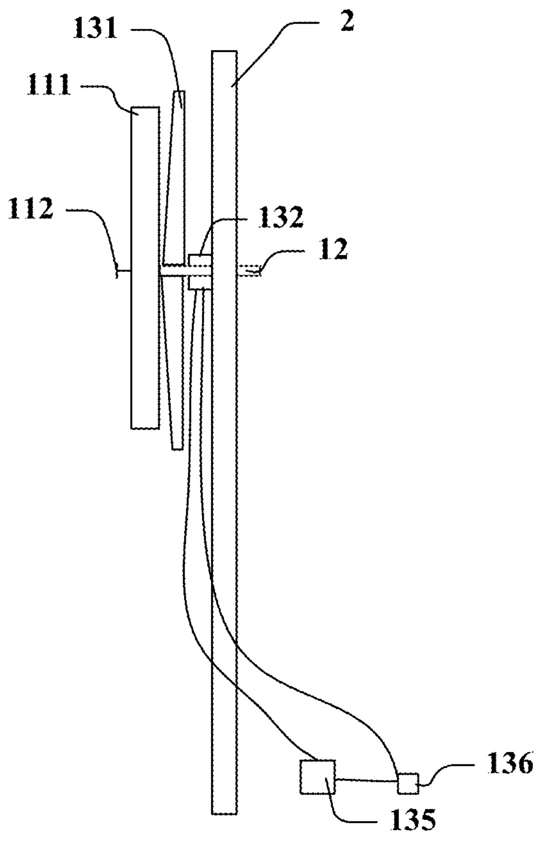
FIG. 18 is another diagram of a possible structure of a base station antenna feeder system according to an embodiment of this application.

FIG. 17 is a diagram of a possible structure of a base station antenna feeder system according to an embodiment of this application. FIG. 18 is another diagram of a possible structure of a base station antenna feeder system according to an embodiment of this application. As shown in FIG. 17 and FIG. 18, in an embodiment, the foregoing power generation assembly 13 may further include a power storage apparatus 135 and a power management apparatus 136. The power storage apparatus 135 is electrically connected to a generator 132, and is configured to store electric energy generated by the generator 132 and release the electric energy when the electric energy is needed. The foregoing power management apparatus 136 is electrically connected to the power storage apparatus 135 and the generator 132. The power management apparatus 136 may control power generated by the generator 132 to be stored in the power storage apparatus 135, supply power to another device connected to the generator 132, or control a purpose of the power stored in the power storage apparatus 135.

It should be noted that specific positions of the power storage apparatus 135 and the power management apparatus 136 are not limited in this application. For example, as shown in FIG. 17, in an example embodiment, the power storage apparatus 135 and the power management apparatus 136 may be disposed near an antenna 11, that is, at a high position of a mounting bracket 2, based on a requirement. As shown in FIG. 18, in another example embodiment, the power storage apparatus 135 and the power management apparatus 136 may alternatively be disposed at a low position of a mounting bracket 2 or to the ground. The power storage apparatus 135 and the power management apparatus 136 may be disposed at different positions. For example, the power storage apparatus 135 is disposed near the antenna 11, and the power management apparatus 136 is disposed at a low position of the mounting bracket 2 or to the ground; or the power management apparatus 136 is disposed near the antenna 11, and the power storage apparatus 135 is disposed at a low position of the mounting bracket 2 or to the ground.

Terms used in the foregoing embodiments are merely intended to describe embodiments, but are not intended to limit this application. The terms "one", "a", "the", "the foregoing", "this", and "the one" in singular forms used in this specification and the appended claims of this application are also intended to include expressions such as "one or more", unless otherwise specified in the context clearly.

Reference to "an embodiment" or the like described in this specification means that one or more embodiments of this application include a feature, structure, or characteristic described with reference to the embodiment. The terms "include", "comprise", "have", and their variants all mean "include, but not limited to", unless otherwise specified.

The foregoing embodiments may be independent embodiments, or may be combined. For example, technical features in at least two embodiments in embodiments may be combined to form a new embodiment. This is not limited in this application.

The foregoing descriptions are merely some implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus, comprising:

a power generation assembly, an antenna, and a fastening assembly;

wherein the power generation assembly comprising a generator and a blade that defines a rotation axis and a rotation surface, wherein a rotating shaft of the blade is connected to the generator, and wherein a side of the antenna that faces the rotation axis has a side surface, and an angle between the side surface and the rotation surface is greater than 90°;

wherein the antenna is disposed around-the rotating shaft of the blade and a projection of the antenna on the rotation axis and a projection of the blade on the rotation axis at least partially overlap; and wherein the blade, the generator, and the antenna are mounted to the fastening assembly, wherein the fastening assembly is configured to attach to a mounting bracket.

2. The communication apparatus according to claim 1, wherein a maximum distance between an edge of the antenna that faces away from the rotation axis of the blade, and the rotation axis is less than or equal to two times a rotation radius of the blade.

3. The communication apparatus according to claim 1, wherein a minimum distance between an edge of the antenna that faces the rotation axis of the blade and the rotation axis is greater than or equal to half a rotation radius of the blade.

4. The communication apparatus according to claim 1, wherein the side surface is a curved surface.

5. The communication apparatus according to claim 1, wherein the antenna is an integrated structure.

6. The communication apparatus according to claim 1, wherein the antenna comprises a circular ring or a regular polygonal ring.

7. The communication apparatus according to claim 1, wherein the antenna comprises at least two sub-antennas mounted to fastening assemblies through attachment members respectively, and each attachment member is configured to adjust a radiation direction of its respective sub-antenna.

8. The communication apparatus according to claim 7, wherein the at least two sub-antennas are arranged in a ring around the rotating shaft.

9. The communication apparatus according to claim 7, wherein a shape of the sub-antenna is a linear shape or an arc shape.

10. The communication apparatus according to claim 1, wherein the fastening assembly comprises a fastening rod and a fastening rotating shaft coaxially connected to the fastening rod, the blade is mounted to the fastening rotating shaft with a fastener, and the antenna is fastened to the fastening rod.

11. The communication apparatus according to claim 1, wherein the blade is made of a metal or a dielectric material.

12. The communication apparatus according to claim 1, wherein the power generation assembly further comprises at least one of a speed changing apparatus connected to the rotating shaft of the blade or a braking apparatus connected to the rotating shaft of the blade.

13. The communication apparatus according to claim 1, wherein the power generation assembly further comprises a power storage apparatus electrically connected to the generator and a power management apparatus electrically connected to the power storage apparatus and the generator separately.

14. The communication apparatus according to claim 13, wherein the power generation assembly is electrically connected to the antenna to supply power to the antenna.

15. The communication apparatus according to claim 1, wherein the antenna comprises a first radiating element array and a second radiating element array, and a working frequency band of the first radiating element array is different from a working frequency band of the second radiating element array.

16. The communication apparatus according to claim 1, wherein the fastening assembly comprises a hollow connecting rod.

17. A base station antenna feeder system, comprising:

a mounting bracket and a communication apparatus, wherein the communication apparatus comprises a power generation assembly, an antenna, and a fastening assembly;

wherein the power generation assembly comprises a generator and a blade that defines a rotation axis and a rotation surface, and a rotating shaft of the blade is connected to the generator, and wherein a side of the antenna that faces the rotation axis has a side surface, and an angle between the side surface and the rotation surface is greater than 90°;

wherein the antenna is disposed around the rotating shaft of the blade; and wherein the blade, the generator, and the antenna are mounted to the fastening assembly; and the fastening assembly is configured to mount the blade, the generator, and the antenna to the mounting bracket.

18. The base station antenna feeder system according to claim 17, wherein a maximum distance between an edge of the antenna that faces away from the rotation axis of the blade, and the rotation axis is less than or equal to two times a rotation radius of the blade.

19. The base station antenna feeder system according to claim 17, wherein a minimum distance between an edge of the antenna that faces the rotation axis of the blade and the rotation axis is greater than or equal to half a rotation radius of the blade.

20. The base station antenna feeder system according to claim 17, wherein the antenna comprises a circular ring or a regular polygonal ring.

* * * * *